US010466698B1

(12) United States Patent
Valasek et al.

(10) Patent No.: US 10,466,698 B1
(45) Date of Patent: Nov. 5, 2019

(54) SYSTEMS AND METHODS TO ENABLE AN AUTONOMOUS MODE OF AN AUTONOMOUS VEHICLE

(71) Applicant: UATC, LLC, San Francisco, CA (US)

(72) Inventors: Christopher Valasek, Pittsburgh, PA (US); Charles Miller, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 124 days.

(21) Appl. No.: 15/672,782

(22) Filed: Aug. 9, 2017

(51) Int. Cl.
*G01C 22/00* (2006.01)
*G05D 1/00* (2006.01)
*G05D 1/02* (2006.01)
*G07C 5/02* (2006.01)

(52) U.S. Cl.
CPC ......... *G05D 1/0061* (2013.01); *G05D 1/0088* (2013.01); *G05D 1/021* (2013.01); *G07C 5/02* (2013.01); *G05D 2201/0213* (2013.01)

(58) Field of Classification Search
CPC .... G05D 1/0061; G05D 1/0088; G05D 1/021; G05D 2201/0213; G07C 5/02
See application file for complete search history.

(56) References Cited

U.S. PATENT DOCUMENTS

| | | | | |
|---|---|---|---|---|
| 10,158,480 B1* | 12/2018 | Winklevoss | .......... | H04L 9/0825 |
| 2010/0146269 A1* | 6/2010 | Baskaran | ................ | G06F 21/10 713/165 |
| 2013/0212659 A1* | 8/2013 | Maher | ..................... | H04L 63/06 726/6 |
| 2013/0286889 A1* | 10/2013 | Cherian | .................. | H04L 63/18 370/254 |
| 2014/0066014 A1* | 3/2014 | Nicholson | ............. | H04W 12/08 455/411 |
| 2014/0309874 A1* | 10/2014 | Ricci | ....................... | G06F 21/31 701/36 |
| 2014/0310031 A1* | 10/2014 | Ricci | ....................... | B60Q 1/00 705/5 |
| 2016/0358477 A1* | 12/2016 | Ansari | ................... | G08G 1/167 |
| 2017/0129335 A1* | 5/2017 | Lu | ........................... | G16H 70/00 |
| 2017/0171375 A1* | 6/2017 | Kamata | ............ | H04M 1/72527 |
| 2017/0269940 A1* | 9/2017 | Valasek | ................. | G06F 9/4403 |
| 2017/0316254 A1* | 11/2017 | Hariri | ..................... | B60R 25/24 |
| 2017/0352215 A1* | 12/2017 | Maiwand | ........... | G07C 9/00896 |
| 2017/0364069 A1* | 12/2017 | Colella | ............... | A61B 5/0022 |

(Continued)

*Primary Examiner* — Mussa A Shaawat
(74) *Attorney, Agent, or Firm* — Dority & Manning, P.A.

(57) ABSTRACT

The present disclosure provides systems and methods to engage an autonomous mode of an autonomous vehicle. In particular, the systems and methods of the present disclosure can receive login credentials for an autonomous vehicle. A user of the autonomous vehicle can be authenticated based on the login credentials. Responsive to authenticating the user, a secure communication session can be established between the autonomous vehicle and one or more remotely located computing systems. Authorization data for an autonomous mode of the autonomous vehicle can be communicated between the autonomous vehicle and the one or more remotely located computing systems. Responsive to communicating the authorization data for the autonomous mode of the autonomous vehicle, the autonomous mode of the autonomous vehicle can be enabled.

20 Claims, 5 Drawing Sheets

(56) References Cited

U.S. PATENT DOCUMENTS

2018/0356817 A1* 12/2018 Poeppel ................ B60W 50/08
2019/0031144 A1*  1/2019 Gat ........................ B60R 25/25
2019/0041850 A1*  2/2019 Chase ................. B60W 50/029

* cited by examiner

SYSTEMS AND METHODS TO ENABLE AN AUTONOMOUS MODE OF AN AUTONOMOUS VEHICLE

FIELD

The present disclosure relates generally to autonomous vehicles. More particularly, the present disclosure relates to systems and methods to enable an autonomous mode of an autonomous vehicle.

BACKGROUND

An autonomous vehicle is a vehicle that is capable of sensing its environment and navigating with minimal or no human input. In particular, an autonomous vehicle can observe its surrounding environment using a variety of sensors and identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to engage an autonomous mode of an autonomous vehicle. The method includes receiving, by a computing system, login credentials for an autonomous vehicle. The method includes authenticating, by the computing system and based on the login credentials, a user of the autonomous vehicle. The method includes, responsive to authenticating the user of the autonomous vehicle, establishing, by the computing system, a secure communication session between the autonomous vehicle and one or more remotely located computing systems. The method includes communicating, via the secure communication session and between the autonomous vehicle and the one or more remotely located computing systems, authorization data for an autonomous mode of the autonomous vehicle. The method includes, responsive to communicating the authorization data for the autonomous mode of the autonomous vehicle, enabling, by the computing system, the autonomous mode of the autonomous vehicle.

Another example aspect of the present disclosure is directed to a computing system that includes one or more processors and one or more non-transitory computer-readable media that collectively store instructions that, when executed by the one or more processors, cause the computing system to perform operations. The operations include, responsive to authenticating a user of an autonomous vehicle, establishing a secure communication session between the autonomous vehicle and one or more remotely located computing systems. The operations include communicating, via the secure communication session and between the autonomous vehicle and the one or more remotely located computing systems, authorization data for an autonomous mode of the autonomous vehicle. The operations include, responsive to communicating the authorization data for the autonomous mode of the autonomous vehicle, enabling the autonomous mode of the autonomous vehicle.

Another example aspect of the present disclosure is directed to one or more non-transitory computer-readable media that collectively store instructions that, when executed by one or more processors, cause a computing system to perform operations. The operations include communicating, via a secure communication session and between an autonomous vehicle and one or more remotely located computing systems, authorization data for an autonomous mode of the autonomous vehicle. The operations include, responsive to communicating the authorization data for the autonomous mode of the autonomous vehicle, enabling the autonomous mode of the autonomous vehicle. The operations include failing to receive additional authorization data for the autonomous mode of the autonomous vehicle from the one or more remotely located computing systems via the secure communication session. The operations include, responsive to failing to receive the additional authorization data for the autonomous mode of the autonomous vehicle, disabling the autonomous mode of the autonomous vehicle.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
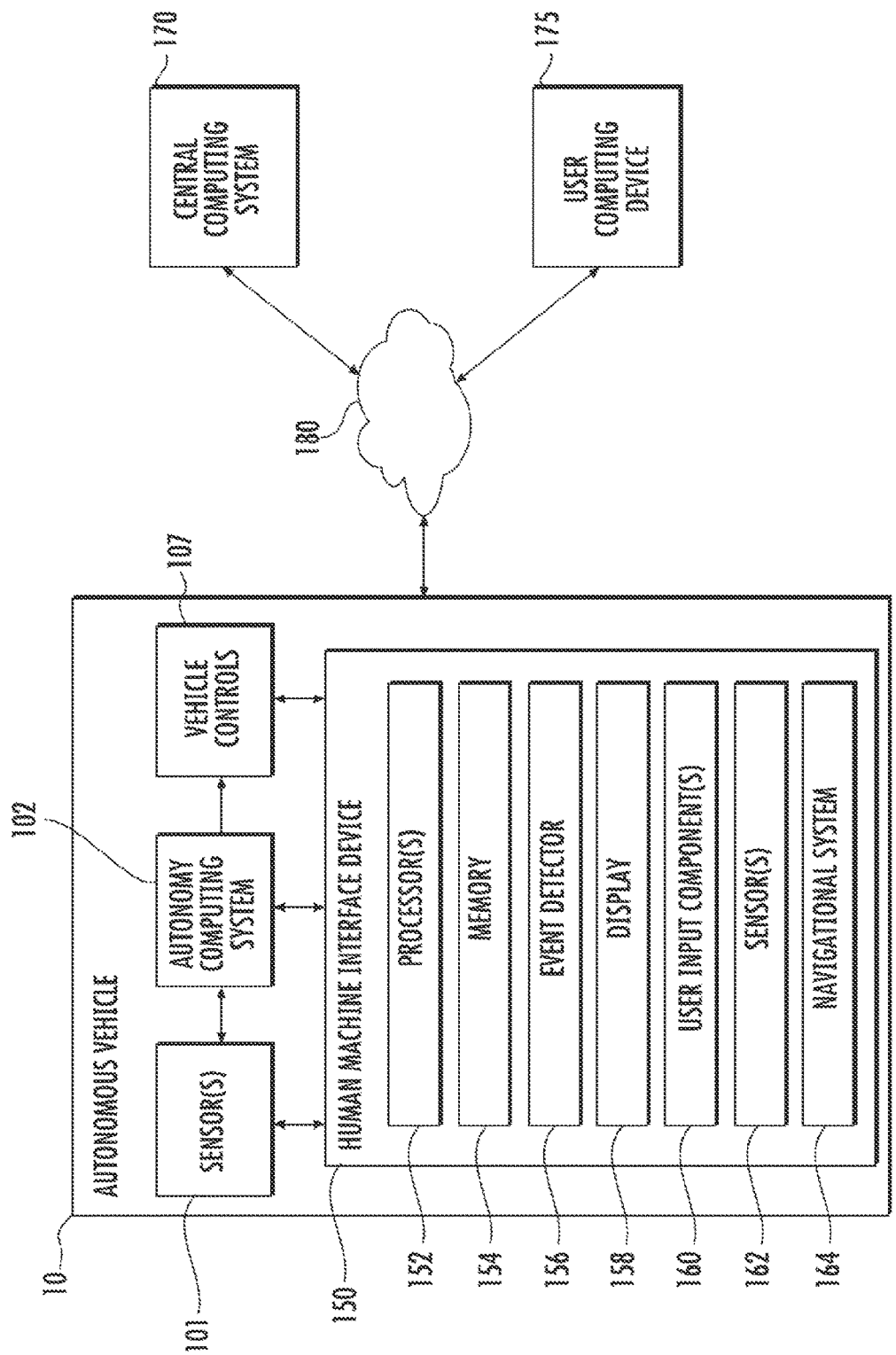
FIG. 1 depicts a block diagram of an example computing system according to example embodiments of the present disclosure.

Generally, the present disclosure is directed to methods and systems for engaging an autonomous mode of an autonomous vehicle. For example, the systems and methods of the present disclosure can be utilized to authenticate a user (e.g., operator) of an autonomous vehicle and enable an autonomous mode of the autonomous vehicle. In particular, in some implementations, a computing system associated with an autonomous vehicle can receive login credentials for the autonomous vehicle and can authenticate a user of the autonomous vehicle based on the login credentials. Responsive to authenticating the user of the autonomous vehicle, the computing system can establish a secure communication session with one or more remotely located computing systems. Authorization data for an autonomous mode of the autonomous vehicle can be communicated between the autonomous vehicle and the one or more remotely located computing systems. Responsive to communicating the authorization data for the autonomous mode of the autonomous vehicle, the computing system can enable the autonomous mode of the autonomous vehicle.

In some implementations, the computing system can fail to receive additional authorization data for the autonomous mode of the autonomous vehicle from the one or more remotely located computing systems. In such implementations, responsive to failing to receive the additional authorization data for the autonomous mode of the autonomous vehicle, the computing system can disable the autonomous mode of the autonomous vehicle. For example, the computing system can fail to receive the additional authorization data for a predetermined timeout period, and responsive to a determination that the additional authorization data has not been received within the predetermined timeout period, the computing system can disable the autonomous mode of the autonomous vehicle.

In some implementations, responsive to receiving the login credentials for the autonomous vehicle, the computing system can identify a user device associated with the user of the autonomous vehicle based on the login credentials, and the computing system can communicate an authorization message to the user device associated with the user of the autonomous vehicle. In such implementations, authenticating the user of the autonomous vehicle can include receiving a confirmation message generated by the user device via the authorization message and authenticating the user in response to receiving the confirmation message.

The systems and methods described herein can provide a number of technical effects and benefits. For example, the systems and methods described herein can allow an operator of an autonomous vehicle to ensure only authorized users can operate an autonomous vehicle in its autonomous mode. Moreover, the systems and methods described herein can allow an operator of an autonomous vehicle to ensure the autonomous vehicle only operates in its autonomous mode when it is in communication with a vehicle management system utilized by its operator.

With reference now to the Figures, example embodiments of the present disclosure will be discussed in further detail.

FIG. 1 depicts a block diagram of an example computing system according to example embodiments of the present disclosure. The example computing system includes an autonomous vehicle 10, a central computing system 170, and a user computing device 175 that are communicatively coupled over one or more communication networks 180. The autonomous vehicle 10 can include one or more sensors 101, an autonomy computing system 102, one or more vehicle controls 107, and a human machine interface device 150.

The human machine interface device 150 can enable communication, control, and/or other interface actions to occur between the autonomous vehicle 10 and a human (e.g., a passenger located within the autonomous vehicle 10). The human machine interface device 150 can be communicatively coupled to the autonomy computing system 102 to enable exchange of data, instructions, and/or requests between the system 102 and the device 150.

The human machine interface device 150 can include or be implemented by one or more computing devices that are operatively connected. The human machine interface device 150 can be an embedded computing device or a stand-alone computing device. In one particular example, the human machine interface device 150 can be a tablet computing device that is positioned within the autonomous vehicle 10 (e.g., within a rear seat area of the autonomous vehicle 10).

The human machine interface device 150 can include one or more processors 152, memory 154, event detector 156, display 158, one or more user input components 160, one or more sensors 162, and navigational system 164. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage media, such as RAM, ROM, EEPROM, EPROM, one or more memory devices, flash memory devices, etc., and combinations thereof.

The memory 154 can store information that can be accessed by the one or more processors 152. For instance, the memory 154 (e.g., one or more non-transitory computer-readable storage mediums, memory devices) can store data that can be obtained, received, accessed, written, manipulated, created, and/or stored. The memory 154 can also store computer-readable instructions that can be executed by the one or more processors 152. The instructions can be software written in any suitable programming language or can be implemented in hardware. Additionally, or alternatively, the instructions can be executed in logically and/or virtually separate threads on processor(s) 152. For example, the memory 154 can store instructions that when executed by the one or more processors 152 cause the one or more processors 152 to perform any of the operations and/or functions described herein.

In some implementations, the human machine interface device 150 can include a display device 158 (e.g., a touch-sensitive display device) and/or other input/output components 160 that provide an interactive user interface. For example, the display device 158 can be a rear-seat display device that is accessible by a passenger that is located in a rear seat of the autonomous vehicle.

In some implementations, in addition or alternatively to the human machine interface device 150, the systems and methods of the present disclosure can include or leverage a user computing device 175 that is associated with the passenger. For example, in some implementations, in addition or alternatively to the display of the user interface by the human machine interface device 150, the interactive user interface can be provided on or accessible via a display of the user computing device 175. The user computing device 175 can be communicatively connected to the human machine interface device 150 via a local area network such as a short range wireless connection (e.g., a Bluetooth, ZigBee, NFC, infrared, etc.) or other forms of connections (e.g., hardwiring). As examples, the user computing device 175 can be a smartphone, tablet computing device, wearable computing device, portable gaming device, hand-held display screen, or other forms of computing devices.

In yet further implementations, certain operations described herein can be performed by a central computing system 170 that is remotely located to the autonomous vehicle 10 and in communication with the autonomous vehicle over one or more wireless networks 180 (e.g., cellular data networks, satellite communication networks, wide area networks, etc.). As an example, the central computing system 170 can include one or more server computing devices. In the event that plural server computing devices are used, the server computing devices can be arranged according to a parallel computing architecture, a sequential computing architecture, or combinations thereof. In some implementations, the central computing system 170 can provide control, monitoring, management, and/or other functionality for a fleet of autonomous vehicles 10.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

Figure 2:
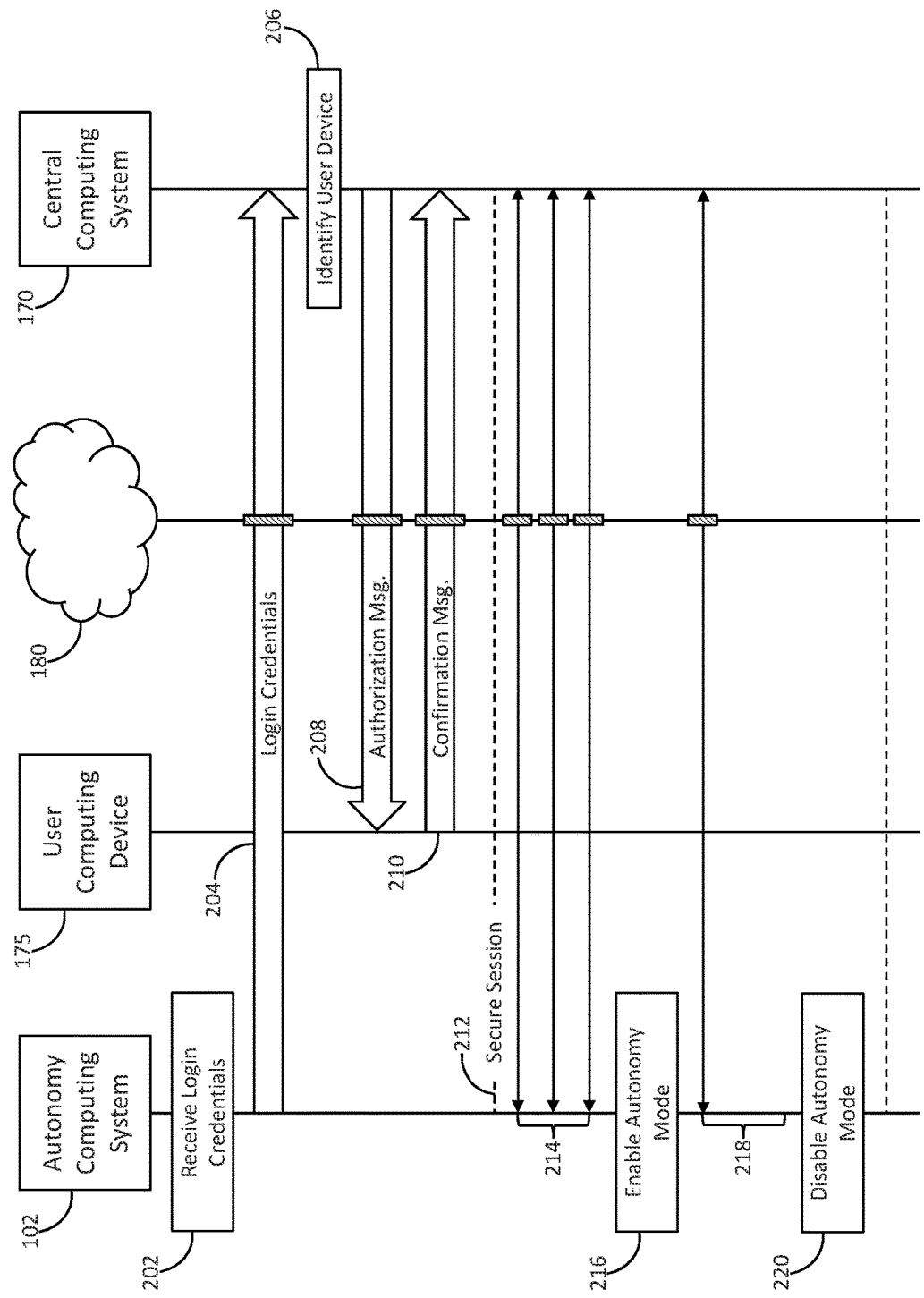
FIG. 2 depicts an example event sequence to engage an autonomous mode of an autonomous vehicle according to example embodiments of the present disclosure.

FIG. 2 depicts an example event sequence to engage an autonomous mode of an autonomous vehicle according to example embodiments of the present disclosure. Referring to FIG. 2, at (202), autonomy computing system 102 can receive login credentials for autonomous vehicle 10. For example, a user of autonomous vehicle 10 can input login credentials (e.g., a username and password) for autonomous vehicle 10 via user input components 160 of human machine interface device 150. At (204), the login credentials can be communicated to central computing system 170 via network(s) 180 (as indicated by the cross hatched box over the line extending downward from network(s) 180). Responsive to receiving the login credentials, at (206), central computing system 170 can identify (e.g., based on the login credentials), user computing device 175. For example, central computing system 170 can determine (e.g., based on the login credentials) that user computing device 175 is associated with the user of autonomous vehicle 10 (e.g., a user corresponding to the login credentials). At (208), central computing system 170 can communicate an authorization message (e.g., as part of a two factor authentication process) to user computing device 175 via network(s) 180. User computing device 175 can utilize the authorization message to generate a confirmation message and, at (210), can communicate the confirmation message to central computing system 170 via network(s) 180. Responsive to receiving the confirmation message, central computing system 170 can authenticate the user of autonomous vehicle 10.

Responsive to authenticating the user of autonomous vehicle 10, central computing system 170 can establish secure communication session 212 (e.g., an internet protocol security (IPsec) session) between autonomy computing system 102 and central computing system 170 via network(s) 180. At (214), central computing system 170 can communicate authorization data for an autonomous mode of autonomous vehicle 10 to autonomy computing system 102 via network(s) 180. Responsive to receiving the authorization data for the autonomous mode of autonomous vehicle 10, autonomy computing system 102 can enable the autonomous mode of autonomous vehicle 10.

At (218), autonomy computing system 102 can fail to receive additional authorization data for the autonomous mode of autonomous vehicle 10 for a predetermined timeout period. Responsive to failing to receive the additional authorization data for the predetermined timeout period, at (220), autonomy computing system 102 can disable the autonomous mode of autonomous vehicle 10. For example, in some implementations, autonomy computing system 102 can disable the autonomous mode of autonomous vehicle 10 by restarting one or more components of autonomy computing system 102.

Figure 3:
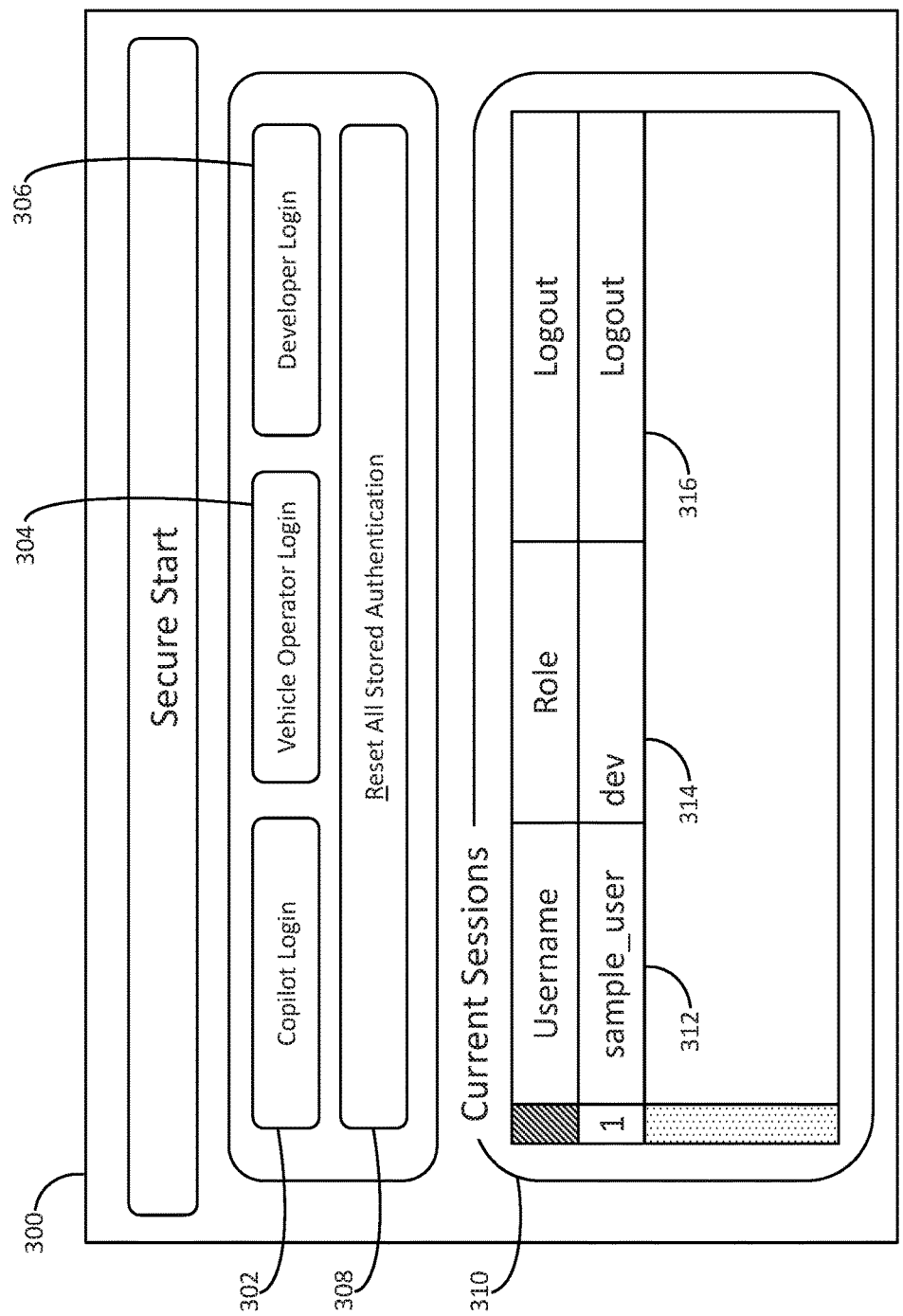
FIG. 3 depicts an example user interface to engage an autonomous mode of an autonomous vehicle according to example embodiments of the present disclosure.

FIG. 3 depicts an example user interface to engage an autonomous mode of an autonomous vehicle according to example embodiments of the present disclosure. Referring to FIG. 3, interface 300 can include one or more elements to initiate a login process for a user of an autonomous vehicle. For example, interface 300 can include elements 302, 304, and 306 for initiating various login processes for different types of users of an autonomous vehicle. For example, different types of users (e.g., copilots, operators, developers) can be associated with various access privileges (e.g., an operator can be allowed to operate autonomous vehicle 10, while a developer can be allowed to modify code configured to control operations of autonomous vehicle 10). Similarly, a fleet of autonomous vehicles can include different vehicle types. For example, a fleet can include operational vehicles designated to carry passengers, and these vehicles can be restricted such that only code certified for operational vehicles is allowed to execute on these vehicles. Additionally or alternatively, a fleet of vehicles can include development vehicles, and these vehicles can be configured such that they can run code that has not been certified for operational vehicles (e.g., code that is under development and/or testing). Interface 300 can also include an element for initiating a process to reset or clear stored authentication information for one or more users of an autonomous vehicle. For example, interface 300 can include element 308 for initiating a process to reset or clear stored authentication information for one or more users of an autonomous vehicle. Interface 300 can further include a region for listing one or more current sessions (e.g., associated with authenticated users). For example, interface 300 can include region 310 for listing one or more current sessions. Region 310 can include entry 312, which can designate a username associated with a current session; region 314, which can designate a role of the user associated with the current session; and region 316, which can comprise an interface element for initiating a logout process for the user associated with the current session.

Figure 4:
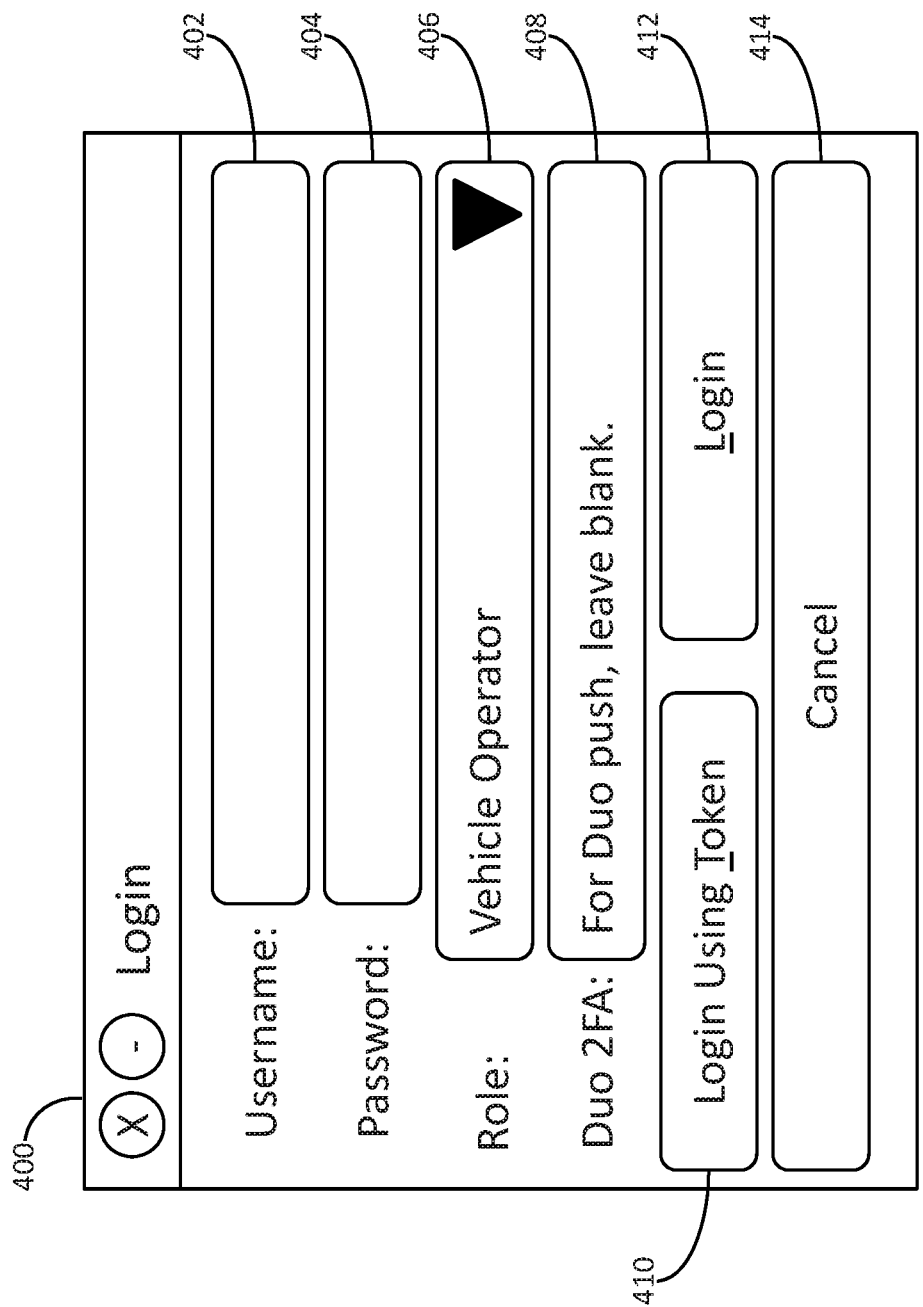
FIG. 4 depicts an additional example user interface to engage an autonomous mode of an autonomous vehicle according to example embodiments of the present disclosure.

FIG. 4 depicts an additional example user interface to engage an autonomous mode of an autonomous vehicle according to example embodiments of the present disclosure. Referring to FIG. 4, interface 400 can include one or more elements for accepting login credentials of a user. For example, interface 400 can include element 402 for accepting a username and element 404 for accepting a user password. Interface 400 can also include an element for designating a role of the user. For example, interface 400 can include element 406 for designating a role of a user. Interface 400 can further include an element for designating an option associated with a two factor authentication process. For example, interface 400 can include element 408 for designating an option associated with a two factor authentication process. Interface 400 can further include one or more elements for initiating a login process. For example, interface 400 can include element 410 (e.g., for initiating a login process using stored authentication information) and element 412 (e.g., for initiating a login process using provided authentication credentials). Interface 400 can further include an element for canceling a login process. For example, interface 400 can include element 414 for canceling a login process.

Figure 5:
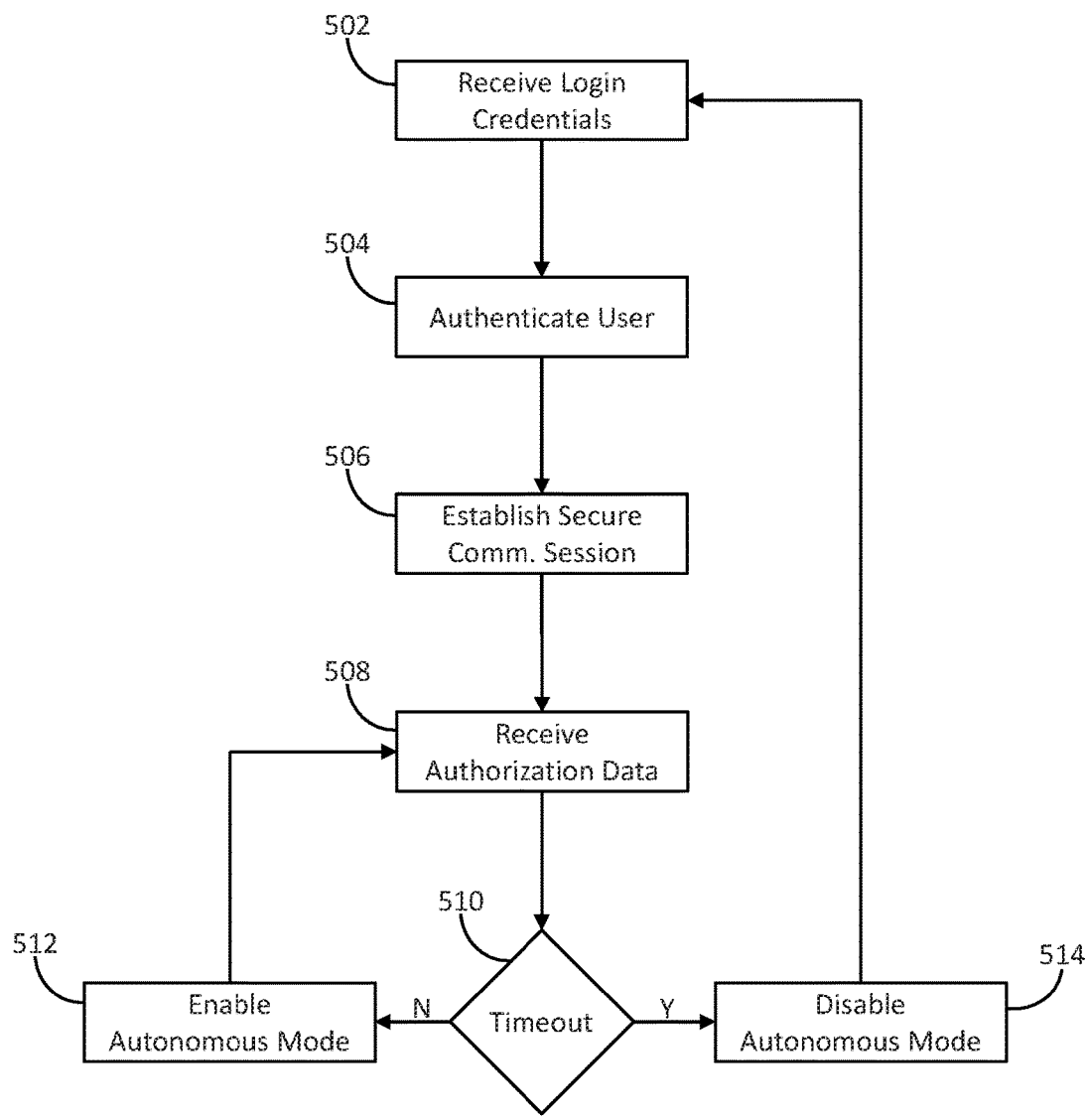
FIG. 5 depicts a flow chart diagram of an example method to engage an autonomous mode of an autonomous vehicle according to example embodiments of the present disclosure.

FIG. 5 depicts a flow chart diagram of an example method to engage an autonomous mode of an autonomous vehicle according to example embodiments of the present disclosure. Referring to FIG. 5, at (502), login credentials for an autonomous vehicle can be received. For example, central computing system 170 can receive (e.g., via network(s) 180) login credentials for autonomous vehicle 10 input by a user of autonomous vehicle 10 via human machine interface device 150. At (504), the user of the autonomous vehicle can be authenticated. For example, central computing system 170 can authenticate the user of autonomous vehicle 10 (e.g., based on the login credentials). At (506), a secure communication session can be established between the autonomous vehicle and one or more remotely located computing systems. For example, secure communication session 212 can be established between autonomy computing system 102 and central computing system 170. At (508), authorization data for an autonomous mode of the autonomous vehicle can be received. For example, central computing system 170 can communicate authorization data for an autonomous mode of autonomous vehicle 10 to autonomy computing system 102 via network(s) 180. At (510), a determination can be made as to whether authorization data for the autonomous mode of the autonomous vehicle has been received within a predefined timeout period. Responsive to determining that authorization data for the autonomous mode of the autonomous vehicle has been received within the predetermined timeout period, at (512), an autonomous mode of the autonomous vehicle can be enabled. The process can then return to (508), where additional authorization data for the autonomous mode of the autonomous vehicle can be received. Returning to (510), responsive to determining that authorization data for the autonomous mode of the autonomous vehicle has not been received within the predetermined timeout period, at (514), the autonomous mode of the autonomous vehicle can be disabled. The process can then return to (502), where login credentials for the autonomous vehicle can be received.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to engage an autonomous mode of an autonomous vehicle, the method comprising:
   prior to the autonomous vehicle being authorized to operate in the autonomous mode:
      receiving, by a computing system comprising one or more computing devices, login credentials for the autonomous vehicle;
      authenticating, by the computing system and based on the login credentials, a user of the autonomous vehicle;
      responsive to authenticating the user of the autonomous vehicle, establishing, by the computing system, a secure communication session between the autonomous vehicle and one or more remotely located computing systems; and
      communicating, via the secure communication session and between the autonomous vehicle and the one or more remotely located computing systems, authorization data for an autonomous mode of the autonomous vehicle; and
   responsive to communicating the authorization data for the autonomous mode of the autonomous vehicle, enabling, by the computing system, the autonomous vehicle to operate in the autonomous mode.

2. The computer-implemented method of claim 1, further comprising:
   failing, by the computing system, to receive additional authorization data for the autonomous mode of the autonomous vehicle from the one or more remotely located computing systems via the secure communication session; and
   responsive to failing to receive the additional authorization data for the autonomous mode of the autonomous vehicle, disabling, by the computing system, the autonomous vehicle from operating in the autonomous mode of the autonomous vehicle.

3. The computer-implemented method of claim 2, wherein:
   failing to receive the additional authorization data for the autonomous mode comprises failing to receive the additional authorization data for a predetermined timeout period; and
   disabling the autonomous vehicle from operating in the autonomous mode of the autonomous vehicle comprises disabling the autonomous vehicle from operating in the autonomous mode of the autonomous vehicle responsive to a determination that the additional authorization data has not been received within the predetermined timeout period.

4. The computer-implemented method of claim 2, wherein disabling the autonomous vehicle from operating in the autonomous mode of the autonomous vehicle comprises restarting at least one of the one or more computing devices.

5. The computer-implemented method of claim 1, wherein receiving the login credentials for the autonomous vehicle comprises receiving the login credentials via a computing device associated with the autonomous vehicle.

6. The computer-implemented method of claim 1, further comprising, responsive to receiving the login credentials for the autonomous vehicle:
   identifying, by the computing system and based on the login credentials, a user device associated with the user of the autonomous vehicle; and
   communicating, by the computing system, an authorization message to the user device associated with the user of the autonomous vehicle.

7. The computer-implemented method of claim 6, wherein authenticating the user of the autonomous vehicle comprises:
   receiving, by the computing system, a confirmation message generated by the user device via the authorization message; and
   responsive to receiving the confirmation message, authenticating the user of the autonomous vehicle.

8. A computing system comprising:
one or more processors; and
one or more non-transitory computer-readable media that collectively store instructions that, when executed by the one or more processors, cause the computing system to perform operations, the operations comprising:
prior to the autonomous vehicle being authorized to operate in the autonomous mode:
responsive to authenticating a user of an autonomous vehicle, establishing a secure communication session between the autonomous vehicle and one or more remotely located computing systems; and
communicating, via the secure communication session and between the autonomous vehicle and the one or more remotely located computing systems, authorization data for an autonomous mode of the autonomous vehicle; and
responsive to communicating the authorization data for the autonomous mode of the autonomous vehicle, enabling the autonomous vehicle to operate in the autonomous mode.

9. The computing system of claim 8, wherein the operations further comprise:
failing to receive additional authorization data for the autonomous mode of the autonomous vehicle from the one or more remotely located computing systems via the secure communication session; and
responsive to failing to receive the additional authorization data for the autonomous mode of the autonomous vehicle, disabling the autonomous vehicle from operating in the autonomous mode of the autonomous vehicle.

10. The computing system of claim 9, wherein:
failing to receive the additional authorization data for the autonomous mode comprises failing to receive the additional authorization data for a predetermined timeout period; and
disabling the autonomous mode of the autonomous vehicle comprises disabling the autonomous vehicle from operating in the autonomous mode of the autonomous vehicle responsive to a determination that the additional authorization data has not been received within the predetermined timeout period.

11. The computing system of claim 8, wherein the operations further comprise:
receiving login credentials for the autonomous vehicle; and
authenticating, based on the login credentials, the user of the autonomous vehicle.

12. The computing system of claim 11, wherein receiving the login credentials for the autonomous vehicle comprises receiving the login credentials via a computing device associated with the autonomous vehicle.

13. The computing system of claim 11, wherein the operations further comprise, responsive to receiving the login credentials for the autonomous vehicle:
identifying, based on the login credentials, a user device associated with the user of the autonomous vehicle; and
communicating an authorization message to the user device associated with the user of the autonomous vehicle.

14. The computing system of claim 13, wherein authenticating the user of the autonomous vehicle comprises:
receiving a confirmation message generated by the user device via the authorization message; and
responsive to receiving the confirmation message, authenticating the user of the autonomous vehicle.

15. One or more non-transitory computer-readable media that collectively store instructions that, when executed by one or more processors, cause a computing system to perform operations, the operations comprising:
prior to the autonomous vehicle being authorized to operate in the autonomous mode, communicating, via a secure communication session and between an autonomous vehicle and one or more remotely located computing systems, authorization data for an autonomous mode of the autonomous vehicle;
responsive to communicating the authorization data for the autonomous mode of the autonomous vehicle, enabling the autonomous vehicle to operate in the autonomous mode;
failing to receive additional authorization data for the autonomous mode of the autonomous vehicle from the one or more remotely located computing systems via the secure communication session; and
responsive to failing to receive the additional authorization data for the autonomous mode of the autonomous vehicle, disabling the autonomous vehicle from operating in the autonomous mode of the autonomous vehicle.

16. The one or more non-transitory computer-readable media of claim 15, wherein:
failing to receive the additional authorization data for the autonomous mode comprises failing to receive the additional authorization data for a predetermined timeout period; and
disabling the autonomous vehicle from operating in the autonomous mode of the autonomous vehicle comprises disabling the autonomous vehicle from operating in the autonomous mode of the autonomous vehicle responsive to a determination that the additional authorization data has not been received within the predetermined timeout period.

17. The one or more non-transitory computer-readable media of claim 15, wherein the operations further comprise:
receiving login credentials for the autonomous vehicle; and
authenticating, based on the login credentials, a user of the autonomous vehicle.

18. The one or more non-transitory computer-readable media of claim 17, wherein the operations further comprise, responsive to authenticating the user of the autonomous vehicle, establishing the secure communication session between the autonomous vehicle and the one or more remotely located computing systems.

19. The one or more non-transitory computer-readable media of claim 17, wherein the operations further comprise, responsive to receiving the login credentials for the autonomous vehicle:
identifying, based on the login credentials, a user device associated with the user of the autonomous vehicle; and
communicating an authorization message to the user device associated with the user of the autonomous vehicle.

20. The one or more non-transitory computer-readable media of claim 19, wherein authenticating the user of the autonomous vehicle comprises:
receiving a confirmation message generated by the user device via the authorization message; and
responsive to receiving the confirmation message, authenticating the user of the autonomous vehicle.

* * * * *